United States Patent [19]

Koch

[11] Patent Number: 4,518,518

[45] Date of Patent: May 21, 1985

[54] COLD PAINT STRIPPING COMPOSITION

[75] Inventor: Robert W. Koch, Norristown, Pa.

[73] Assignee: Amchem Products, Inc., Ambler, Pa.

[21] Appl. No.: 580,034

[22] Filed: Feb. 14, 1984

Related U.S. Application Data

[63] Continuation-in-part of Ser. No. 480,345, Mar. 30, 1983, abandoned.

[51] Int. Cl.$^3$ .................. B08B 3/04; C09D 9/00; C11D 7/50; C23G 5/02
[52] U.S. Cl. .................... 252/142; 134/38; 252/171; 252/172; 252/558; 252/DIG. 8
[58] Field of Search ............ 134/38; 252/DIG. 8, 252/558, 171, 172, 142

[56] References Cited

U.S. PATENT DOCUMENTS

| | | | |
|---|---|---|---|
| 1,742,347 | 1/1930 | Fries | 252/DIG. 8 X |
| 1,884,774 | 10/1932 | Lougovoy | 252/DIG. 8 X |
| 3,072,579 | 1/1963 | Newman | 252/DIG. 8 X |
| 3,075,923 | 6/1963 | Berst et al. | 252/DIG. 8 X |
| 3,324,039 | 6/1967 | Rosenfeld | 134/38 X |
| 3,356,614 | 12/1967 | Gilbert | 252/171 X |
| 3,629,004 | 12/1971 | Cooper | 252/DIG. 8 X |
| 3,705,857 | 12/1972 | Clarke et al. | 252/171 X |
| 3,737,386 | 6/1973 | Geiss et al. | 252/DIG. 8 X |
| 3,887,497 | 6/1975 | Ulvid | 252/139 X |

OTHER PUBLICATIONS

McCutcheon's "Detergents and Emulsifiers" 1980 International Addition, p. 184.
Hawley "The Condensed Chemical Dictionary" 8th Edition, p. 604.

Primary Examiner—John E. Kittle
Assistant Examiner—Mukund J. Shah
Attorney, Agent, or Firm—Ernest G. Szoke; Henry E. Millson, Jr.; Mark A. Greenfield

[57] ABSTRACT

A cold paint stripper composition and replenisher composition for removing paint from solid surfaces comprising an aqueous composition containing a chloroacetic acid, a relatively low concentration of a $C_1$–$C_3$ chlorinated hydrocarbon, an anionic sulfonate, naphthenic acid, a sorbitan $C_{12}$–$C_{18}$ ester, and, optionally, a corrosion inhibitor, tetrahydrofuran, paraffin wax, and formic acid.

29 Claims, No Drawings

COLD PAINT STRIPPING COMPOSITION

This application is a continuation-in-part of pending application Ser. No. 480,345 filed Mar. 30, 1983.

BACKGROUND OF THE INVENTION

This invention relates to a composition for the removal of a wide variety of paint films from solid substrates.

Compositions for stripping paint films from solid substrates are well known and have been in the marketplace for many years. Paint strippers are basically of two fundamental types; the so-called hot strippers that function at elevated temperatures and the so-called cold strippers that function without the need for added heat. Examples of so-called hot stripper compositions are given in U.S. Pat. No. 3,576,673 issued Apr. 27, 1971 to Harry R. Charles et al. These compositions are basically highly alkaline aqueous compositions which are used at temperatures around 180° F. With the advent of escalating energy costs, the hot strippers have become less favored than the cold strippers. Additionally, hot paint strippers have a number of problems associated with their use, such as rapid bath depletion; the need for constant additions of replenisher; lack of a simple replenisher control method; metal discoloration; odor and fume problems; and safety problems associated with the use of hot alkali solutions.

Cold paint strippers, which are generally nonaqueous compositions formulated with chlorinated hydrocarbons, usually remove paint more quickly than the hot stripper compositions. However, cold paint strippers have their own problems. For example, they cannot be diluted with water; they have extremely high charge-up costs; they have a high evaporation rate even at room temperature; and they also have odor and irritation problems.

Examples of compositions for cold stripping are given in U.S. Pat. No. 3,335,087 issued Aug. 8, 1967 to James Joseph Keers, Jr. and U.S. Pat. No. 3,950,185 issued Apr. 13, 1976 to Mitsuo Toyama et al. The Keers patent discloses compositions containing hydrofluoric acid, hydroxy aromatic compounds and chlorine substituted hydrocarbons. The Toyama et al patent related to compositions containing halogenated hydrocarbon solvents and a pressure sensitive adhesive component. Use of compositions containing hydrofluoric acid as disclosed in the Keers patent presents health and safety problems which limit their use. Compositions such as those disclosed in the Toyama et al patent have the disadvantage of requiring a paper or cloth to be placed on the film-removing composition and then peeling off the paper or cloth, taking with it the paint film. As well as being time and material intensive, such a procedure is, of course, impractical for articles with complex surfaces.

Additionally, cold paint strippers in commercial use usually contain large quantities, e.g. 80–90%, of methylene chloride as the chlorinated hydrocarbon. Such compositions, while effective, tend to be expensive due both to the initial cost of the methylene chloride and to the fact that even under relatively cool conditions methylene chloride has a high vapor pressure and, therefore, a high evaporation rate.

DESCRIPTION OF THE INVENTION

The present invention relates to a homogeneous aqueous cold stripping bath composition which contains the following ingredients:

| Ingredient | BATH COMPOSITION Broad Range, Wt. % | Preferred Range, Wt. % |
| --- | --- | --- |
| Chloroacetic acid | about 5 to about 12.5 | about 9 to about 11.5 |
| Chlorinated $C_1$–$C_3$ hydrocarbon | about 5 to about 15 | about 9 to about 12.5 |
| Anionic sulfonate | about 5 to about 11 | about 6 to about 8.5 |
| Naphthenic acid | about 0.05 to about 2.5 | about 0.25 to about 2 |
| Sorbitan $C_{12}$–$C_{18}$ ester | about 0.5 to about 3.5 | about 1 to about 2 |
| Formic acid | 0 to about 4 | about 0.05 to about 2.5 |
| Paraffin wax | 0 to about 2.5 | about 0.5 to about 2 |
| Metal corrosion inhibitor | 0 to about 2 | about 0.5 to about 1.5 |
| Tetrahydrofuran | 0 to about 10 | about 5 to about 10 |
| Water | Remainder | Remainder |

The weight percents are based on the total weight of the composition. In the above composition, the paraffin wax when present acts to thicken the mixture and further retard evaporation of the chlorinated $C_1$–$C_3$ hydrocarbon. The formic acid component, while optional, is highly preferred, since the above compositions are usually prepared from concentrates, and formic acid acts to stabilize the concentrates. While tetrahydrofuran can be added as an optional ingredient to the above composition to further enhance the paint stripping capability of the bath, the use of tetrahydrofuran results in a flammable product which also has an objectionable odor. Accordingly, the inclusion of tetrahydrofuran should only be made where the above objections thereto are less important than the enhanced paint stripping capability of the composition.

The preparation of the above bath composition can be carried out most conveniently by diluting with water a concentrate containing the above ingredients. The most useful concentrate for such purpose contains the ingredients thereof in the following concentrations:

| Ingredient | CONCENTRATE COMPOSITION Broad Range, Wt. % | Preferred Range, Wt. % |
| --- | --- | --- |
| Chloroacetic acid | about 10 to about 25 | about 18 to about 23 |
| Chlorinated $C_1$–$C_3$ hydrocarbon | about 10 to about 30 | about 18 to about 25 |
| Anionic sulfonate | about 10 to about 22 | about 12 to about 17 |
| Naphthenic acid | about 0.1 to about 5 | about 0.5 to about 4 |
| Sorbitan $C_{12}$–$C_{18}$ ester | about 1 to about 7 | about 2 to about 4 |
| Formic acid | 0 to about 8 | about 0.1 to about 5 |
| Paraffin wax | 0 to about 5 | about 1 to about 4 |
| Metal corrosion inhibitor | 0 to about 4 | about 1 to about 3 |
| Tetrahydrofuran | 0 to about 20 | about 10 to about 20 |
| Water | Remainder | Remainder |

To prepare the bath composition, the above concentrate is diluted with an approximately equal quantity of water.

For the chloroacetic acid component of the above bath and concentrate compositions, a single chloroacetic acid or a mixture of chloroacetic acids can be used. Monochloroacetic acid used alone is preferred for use herein. Dichloro- and trichloroacetic acids, while also active, are quite corrosive to ferrous metals and are, therefore, less preferred.

The chlorinated $C_1$ to $C_3$ hydrocarbon component can be a single hydrocarbon or a mixture of hydrocarbons. Preferred is methylene chloride, although other chlorinated hydrocarbons such as ethylene dichloride, propylene dichloride, and chloroform can also be employed herein.

The anionic sulfonate component is preferably an alkyl benzene sulfonic acid or an alkyl amine sulfonate, for example, a benzene sulfonic acid or an alkyl, carboxyalkyl, alkenyl or carboxyalkenyl amine sulfonate containing from 1 to 3 $C_1$ to $C_{18}$ straight or branched chain alkyl groups. As the anionic sulfonate, dodecylbenzene sulfonic acid is preferred, although other sulfonates that can be used include decylbenzene sulfonic acid, xylene sulfonic acid, alkyl amine sulfonates such as the alkylamine dodecylbenzene sulfonate marketed under the trademark NINATE 411 by Stepan Chemical Co., SUL-FON-ATE OA5 a sodium salt of sulfonate oleic acid marketed by Cities Service Co., PETROSOL 745 a sodium petroleum sulfonate marketed by Penreco Division of Pennzoil, PETRONATE L which is a sodium petroleum sulfonate marketed by Witco Chemical Corp., and PETRONATE HL which is a sodium petroleum sulfonate marketed by Witco Chemical Corp.

The use of an anionic sulfonate in the compositions of the invention has been found to serve a dual function, i.e. to improve the paint stripping capability of the present compositions, and to stabilize the compositions to prevent phase separation.

The sorbitan $C_{12}$–$C_{18}$ ester component can be a single ester or a combination of two or more such esters. The sorbitan ester can be a monoester, a diester, or a triester of sorbitol with $C_{12}$–$C_{18}$ saturated or olefinically unsaturated fatty acids. Examples of such esters are sorbitan trioleate, sorbitan tristearate, sorbitan monooleate, sorbitan monostearate, sorbitan monolaurate, sorbitan monopalmitate, etc., with sorbitan triesters, and especially sorbitan trioleate, being preferred. Such esters are sold commercially by ICI Americas Inc. under the "Span" trade names. For example, sorbitan trioleate is sold as Span 85.

The corrosion inhibitor which can be added as an optional ingredient to the bath composition and the concentrate composition can be any known metal corrosion inhibitor such as for example, those containing a dialkyl thiourea. Commercial metal corrosion inhibitors that can be used herein include the composition marketed by Amchem Products, Inc., Ambler, Pennsylvania, under the tradename RODINE 95. Other commercially available metal corrosion inhibitors that can be used in the practice of the invention include RODINE 92A, RODINE 31A, and RODINE 241, all of which are also marketed by Amchem Products, Inc.

The bath compositions of the invention can be used at temperatures in the range of from about 50° to about 100° F., preferably in the range of from about 65° to about 80° F., and more preferably at prevailing room temperature. Painted parts are immersed in the bath for a period of time somewhat dependent on the composition of the paint film subjected to the stripping operation. Normally a period of time of from about 5 minutes to about 120 minutes, and usually from about 10 minutes to about 20 minutes is sufficient to remove essentially all of the paint from the painted substrate. Upon removal of the stripped parts from the bath, it is advantageous to thoroughly rinse them with cold water immediately upon their removal.

The solid substrates containing the paint film are normally ferrous metal components such as steel automobile parts and tractor parts, steel filing cabinets, etc. The present bath compositions are particularly suitable for stripping electrodeposited and high solids paint systems therefrom.

The bath compositions can be replenished from time-to-time by additions of chlorinated $C_1$–$C_3$ hydrocarbon when the level of this ingredient decreases due to gradual evaporation. Also, water can be added when and if the water content becomes too low due to evaporation. The bath density is preferably maintained above 1.087 g/ml. Also, bath acidity should be maintained above 8 ml. of 1N NaOH per 5 ml. bath sample (phenolphthalein end point). When the concentrations nonvolatile bath ingredients falls below the levels given above due to losses from drag-out, additional concentrate is added thereto to restore the bath concentration to operating levels.

The present compositions have a number of significant advantages over prior art systems. In particular, the present bath compositions provide faster stripping, more complete paint removal in crevices, simple control methods, less handling of the stripped parts, little or no metal discoloration, no outside heat requirement, economical charge-up, and a low methylene chloride content with attendant low evaporation rate.

A further advantage of the compositions of the invention is that the stripped paint rather than dissolving in the bath sinks to the bottom in sheets where it can be readily removed from the bath and does not otherwise contaminate it.

The following examples are given to illustrate the invention and not to limit it.

EXAMPLE I

A concentrate composition was prepared from the following ingredients:

| CONCENTRATE COMPOSITION | |
|---|---|
| Ingredient | % by weight |
| Monochloroacetic acid | 20.966 |
| Methylene chloride | 20.193 |
| Dodecylbenzene sulfonic acid | 14.109 |
| Water | 35.476 |
| Rodine 95 | 1.015 |
| Span 85 | 3.775 |
| Paraffin wax | 2.789 |
| Naphthenic acid | 0.927 |
| Formic acid | 0.751 |

The above concentrate composition was an amber colored liquid having a layer of paraffin wax floating on the top. The concentrate was prepared by first adding the water to a mixer. With good agitation, the monochloroacetic acid was then added to the mixer. Next, the formic acid was added with mixing. Then the dodecylbenzene sulfonic acid and the RODINE 95 were added with mixing, and the temperature adjusted to 70–72° F. Next the methylene chloride was added with mixing. The Span 85 and the naphthenic acid were added next, followed by addition of melted paraffin wax to form the final composition.

A bath composition was formed from the above concentrate by diluting the concentrate with an equal quantity of water. In a paint stripping test, 13 3"×4" painted steel panels were employed. These panels had been coated first with a commercial zinc phosphate conversion coating, followed by a coating of GM paint system No. 4, which consisted of a primer and a paint topcoat. The panels were cured, and then immersed one-by-one in 900 ml of the above bath composition, maintained at room temperature. Paint stripping time for the panels was about 20 minutes per panel. All of the panels were stripped completely free of paint, and after rinsing with water, were clean and bright and suitable for further processing.

EXAMPLE II

Using the identical bath composition that was used in EXAMPLE I, 10 automobile rim parts which had been coated with a zinc phosphate conversion coating followed by a cationic electrodeposited paint were immersed in the bath at room temperature for a period of about 20 minutes. All of the parts were stripped completely free of paint, and after rinsing with water, were clean and bright and suitable for further processing.

EXAMPLE III

Using the identical bath composition used in EXAMPLE II, 10 3"×4" sections cut from vacuum cleaner housing parts which had been coated with a light coating of an iron phosphate conversion coating followed by spraying with a high solids paint topcoat were immersed in the bath at room temperature for a period of about 20 minutes. All of the parts were stripped completely free of paint, and after rinsing with water, were clean and bright and suitable for further processing.

What is claimed is:

1. An aqueous film removing composition comprising:
   (a) from about 5 to about 12.5 wt. % of at least one chloroacetic acid;
   (b) from about 5 to about 15 wt. % of at least one chlorinated $C_1$–$C_3$ hydrocarbon;
   (c) from about 5 to about 11 wt. % of at least one anionic sulfonate;
   (d) from about 0.05 to about 2.5 wt. % of naphthenic acid;
   (e) from about 0.5 to about 3.5 wt. % of at least one sorbitan $C_{12}$–$C_{18}$ ester;
   (f) from 0 to about 4 wt. % formic acid;
   (g) from 0 to about 2 wt. % of a metal corrosion inhibitor;
   (h) from 0 to about 10 wt. % of tetrahydrofuran;
   (i) from 0 to about 2.5 wt. % paraffin wax; and
   (j) water;
wherein the wt. % values are based on the total weight of the aqueous film removing composition.

2. A composition in accordance with claim 1 wherein the chloroacetic acid in (a) is present in an amount in the range of from about 9 to about 11.5 wt. %.

3. A composition in accordance with claim 1 wherein the chlorinated $C_1$–$C_3$ hydrocarbon in (b) is present in an amount in the range of from about 9 to about 12.5 wt. %.

4. A composition in accordance with claim 1 wherein the anionic sulfonate in (c) is present in an amount in the range of from about 6 to about 8.5 wt. %.

5. A composition in accordance with claim 1 wherein the naphthenic acid in (d) is present in an amount in the range of from about 0.25 to about 2 wt. %.

6. A composition in accordance with claim 1 wherein the sorbitan $C_{12}$–$C_{18}$ ester in (e) is present in an amount in the range of from about 1 to about 2 wt. %.

7. A composition in accordance with claim 1 wherein the formic acid in (f) is present in an amount in the range of from about 0.05 to about 2.5 wt. %.

8. A composition in accordance with claim 1 wherein the chloroacetic acid in (a) is present in an amount in the range of from about 9 to about 11.5 wt. %; the chlorinated $C_1$–$C_3$ hydrocarbon in (b) is present in an amount in the range of from about 9 to about 12.5 wt. %; the anionic sulfonate in (c) is present in an amount in the range of from about 6 to about 8.5 wt. %; the naphthenic acid in (d) is present in an amount in the range of from about 0.25 to about 2 wt. %; and the sorbitan $C_{12}$–$C_{18}$ ester in (e) is present in an amount in the range of from about 1 to about 2 wt. %.

9. A composition in accordance with claim 1 wherein the chloroacetic acid in (a) is monochloroacetic acid.

10. A composition in accordance with claim 1 wherein the chlorinated $C_1$–$C_3$ hydrocarbon in (b) is methylene chloride.

11. A composition in accordance with claim 1 wherein the anionic sulfonate in (c) is dodecylbenzene sulfonic acid.

12. A composition in accordance with claim 1 wherein the sorbitan $C_{12}$–$C_{18}$ ester in (e) is sorbitan trioleate.

13. A composition in accordance with claim 1 wherein the chloroacetic acid in (a) is monochloroacetic acid; the chlorinated $C_1$–$C_3$ hydrocarbon in (b) is methylene chloride; the anionic sulfonate in (c) is dodecylbenzene sulfonic acid; and the sorbitan $C_{12}$–$C_{18}$ ester in (e) is sorbitan trioleate.

14. A concentrate composition for use in preparing an aqueous film removing composition comprising:
   (a) from about 10 to about 25 wt. % of at least one chloroacetic acid;
   (b) from about 10 to about 30 wt. % of at least one chlorinated $C_1$–$C_3$ hydrocarbon;
   (c) from about 10 to about 22 wt. % of at least one anionic sulfonate;
   (d) from about 0.1 to about 5 wt. % of naphthenic acid;
   (e) from about 1 to about 7 wt. % of at least one sorbitan $C_{12}$–$C_{18}$ ester;
   (f) from 0 to about 8 wt. % formic acid;
   (g) from 0 to about 4 wt. % of a metal corrosion inhibitor;
   (h) from 0 to about 20 wt. % of tetrahydrofuran;
   (i) from 0 to about 5 wt. % paraffin wax; and
   (j) water; wherein the wt. % values are based on the total weight of the concentrate composition.

15. A composition in accordance with claim 14 wherein the chloroacetic acid in (a) is present in an amount in the range of from about 18 to about 23 wt. %.

16. A composition in accordance with claim 14 wherein the chlorinated $C_1$–$C_3$ hydrocarbon in (b) is present in an amount in the range of from about 18 to about 25 wt. %.

17. A composition in accordance with claim 14 wherein the anionic sulfonate in (c) is present in an amount in the range of from about 12 to about 17 wt. %.

18. A composition in accordance with claim 14 wherein the naphthenic acid in (d) is present in an amount in the range of from about 0.5 to about 4 wt. %.

19. A composition in accordance with claim 14 wherein the sorbitan $C_{12}$–$C_{18}$ ester in (e) is present in an amount in the range of from about 2 to about 4 wt. %.

20. A composition in accordance with claim 14 wherein the formic acid in (f) is present in an amount in the range of from about 0.1 to about 5 wt. %.

21. A composition in accordance with claim 14 wherein the chloroacetic acid in (a) is present in an amount in the range of from about 18 to about 23 wt. %; the chlorinated $C_1$–$C_3$ hydrocarbon in (b) is present in an amount in the range of from about 18 to about 25 wt. %; the anionic sulfonate in (c) is present in an amount in the range of from about 12 to about 17 wt. %; the naphthenic acid in (d) is present in an amount in the range of from about 0.5 to about 4 wt. %; and the sorbitan $C_{12}$–$C_{18}$ ester in (e) is present in an amount in the range of from about 2 to about 4 wt. %.

22. A composition in accordance with claim 14 wherein the chloroacetic acid in (a) is monochloroacetic acid.

23. A composition in accordance with claim 14 wherein the chlorinated $C_1$–$C_3$ hydrocarbon in (b) is methylene chloride.

24. A composition in accordance with claim 14 wherein the anionic sulfonate in (c) is dodecylbenzene sulfonic acid.

25. A composition in accordance with claim 1 wherein the sorbitan $C_{12}$–$C_{18}$ ester in (e) is sorbitan trioleate.

26. A composition in accordance with claim 14 wherein the chloroacetic acid in (a) is monochloroacetic acid; the chlorinated $C_1$–$C_3$ hydrocarbon in (b) is methylene chloride; the anionic sulfonate in (c) is dodecylbenzene sulfonic acid; and the sorbitan $C_{12}$–$C_{18}$ ester in (e) is sorbitan trioleate.

27. A method for removing a paint film from the surfaces of a solid substrate containing a paint film thereon comprising contacting said paint film-containing solid substrate with an aqueous paint film removing composition which contains:
   (a) from about 5 to about 12.5 wt. % of at least one chloroacetic acid;
   (b) from about 5 to about 15 wt. % of at least one chlorinated $C_1$–$C_3$ hydrocarbon;
   (c) from about 5 to about 11 wt. % of at least one anionic sulfonate;
   (d) from about 0.05 to about 2.5 wt. % of naphthenic acid;
   (e) from about 0.5 to about 3.5 wt. % of at least one sorbitan $C_{12}$–$C_{18}$ ester;
   (f) from 0 to about 4 wt. % formic acid;
   (g) from 0 to about 2 wt. % of a metal corrosion inhibitor;
   (h) from 0 to about 10 wt. % of tetrahydrofuran;
   (i) from 0 to about 2.5 wt. % paraffin wax; and
   (j) water;
wherein the wt. % values are based on the total weight of the aqueous film removing composition.

28. A method in accordance with claim 27 wherein the film-containing solid substrate is immersed in the aqueous film removing composition.

29. A method in accordance with claim 27 wherein the aqueous film removing composition is maintained at about room temperature.

* * * * *